Nov. 20, 1928.
E. H. McCLOUD
1,692,751
BUMPER
Filed March 5, 1928
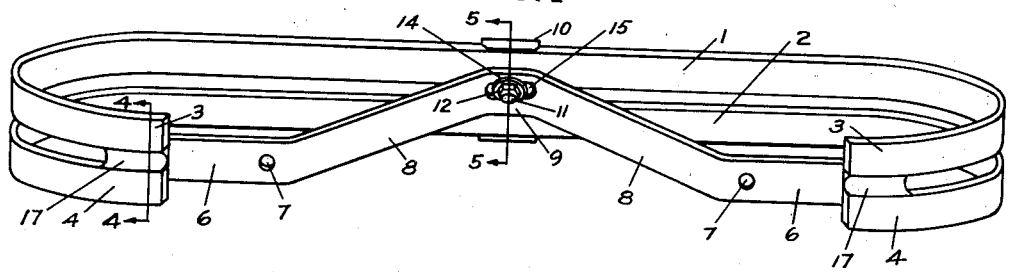
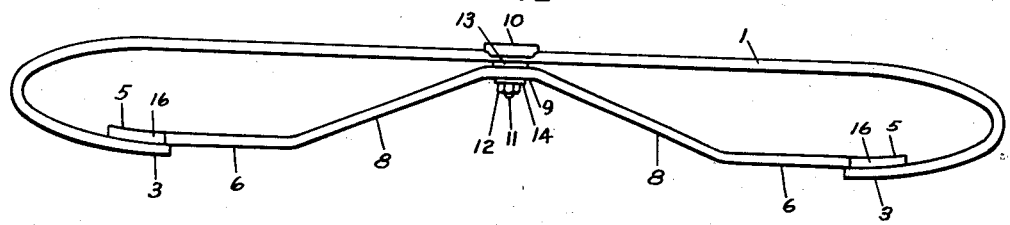
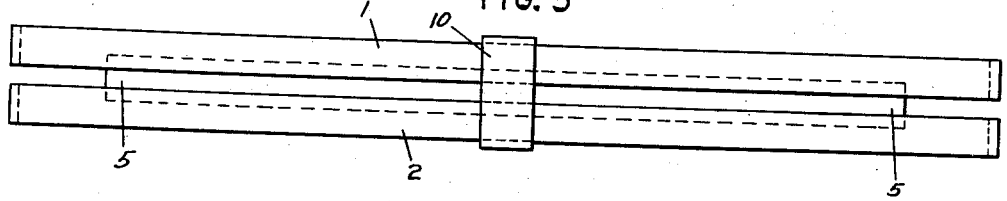
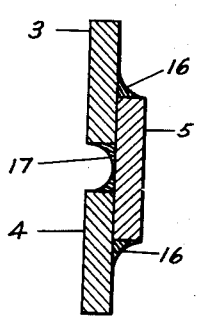
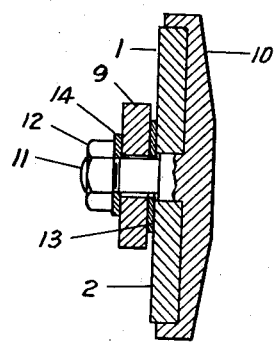
INVENTOR
EDWARD H. McCLOUD.
BY Toulmin & Toulmin
ATTORNEYS Patented Nov. 20, 1928.

1,692,751

UNITED STATES PATENT OFFICE.

EDWARD H. McCLOUD, OF COLUMBUS, OHIO, ASSIGNOR TO THE CENTRAL BRASS AND FIXTURE COMPANY, OF SPRINGFIELD, OHIO, A CORPORATION OF OHIO.

BUMPER.

Application filed March 5, 1928. Serial No. 259,059.

My invention relates to bumpers.

It is the object of my invention to provide a bumper structure in which the supporting bar and the bumper or buffer bars may be integrally connected as a single unitary structure for not only supporting, but also for spacing the bars.

It is an additional object to provide such support so attached at a certain portion or portions to permit of relative movement between the supporting bar and the bumper bars despite the integral connection therebetween in other portions.

It is my object to provide a compensating connection in case of shock between the center of the supporting bar and the center of the bumper bars, while at the same time rigidly and integrally attaching the supporting bar and the ends of the bumper bars and thereby spacing in a predetermined relationship the bumper bars without the need of clamps, bolts and other attachments which are either unsightly or are too weak or have a tendency to rattle in addition to adding expense and depreciating the appearance of the car to which the bumpers may be attached.

Referring to the drawings—

Figure 1 is a perspective from the rear of the supporting bar and bumper bars.

Figure 2 is a top plan view thereof.

Figure 3 is a front elevation thereof.

Figure 4 is a section on the line 4—4 of Figure 1.

Figure 5 is a section on the line 5—5 of Figure 1.

Referring to the drawings in detail, 1 and 2 are spaced bumper bars having inwardly and rearwardly turned U-shaped ends 3 and 4 which are joined together in spaced relationship by the end 5 of the supporting bar 6 which overlaps the inner ends 3 and 4 of the bumper bars. This supporting bar 6 is attached by bolts through the bolt holes 7 to the chassis of the vehicle to which the bumper is attached or by clamps or any other means which the user may desire to select. The attaching ends 5 are substantially parallel to and spaced from the front portions of the bumper bars 1 and 2, but the central portions 8 of the supporting bar extend laterally and forwardly where they are joined by a flat plate 9 lying in overlapping relationship behind the central portion of the bumper bars 1 and 2. At this point these bumper bars are joined together by an overlapping clamp 10 which has projecting from the center thereof and rearwardly between the bars 1 and 2, a bolt 11 carrying a nut 12, mounted on the inside of the plate 9 of the supporting bar 6. Either side of the plate 9 is engaged by washers 13 and 14 carried on the bolt 11. The plate 9 is provided with a slot 15 so that in case of impact with the bars 1 and 2 there may be a sliding movement of the bumper bars 1 and 2 with respect to the supporting bar 6 centrally thereof.

By welding the ends 5, 3 and 4 with the end 5 overlapping the ends 3 and 4, I eliminate clamps, I can manufacture the supporting bar 6 and the bumper bars 1 and 2 independently and can then join them in permanent, rigid relationship as in one piece, which one piece I would be unable to manufacture otherwise.

I thus secure the advantages of relative movement between the parts, a full resilient bumper bar and an integral structure that eliminates the usual spacing, clamping and attaching means.

In carrying out this welding, I prefer to provide the welds 16 on the upper and lower edges of the end 5 and the welds 17 between the bars 1 and 2 adjacent the surface of the end 5, so that the welds serve to attach and space the end 5 of the supporting bar 6 and the bumper bars 1 and 2.

It is to be understood that I desire to comprehend within my invention such modifications as may be desirable within the scope of my claims to adapt the invention to varying conditions of use.

Having thus fully described my invention, what I claim is new and desire to secure by Letters Patent, is:

1. In a bumper, a bumper bar and supporting bar connected to the ends thereof, otherwise spaced therefrom, and means of attaching a portion of the supporting bar so as to have relative lateral movement with respect to the bumper bars.

2. In a bumper, a bumper bar and supporting bar connected to the ends thereof, otherwise spaced therefrom, and means of attaching a portion of the supporting bar so as to have relative lateral movement with respect to the bumper bars, said point of attachment being centrally of the supporting bar and the bumper bars.

3. In a bumper, a supporting bar to be supported adjacent its ends on a vehicle, means for slidably attaching the center of said bar to a bumper bar and means of integrally attaching the ends thereof beyond the points of support to points adjacent the ends of the bumper bar.

4. In a bumper, a bumper bar having rearwardly and inwardly turned ends terminating in faces parallel to the front portion of the bars, a supporting bar having ends integrally attached therewith and a forwardly extending central portion attached to the center of the bumper bar.

5. In a bumper, a bumper bar having rearwardly and inwardly turned ends terminating in faces parallel to the front portion of the bars, a supporting bar having ends integrally attached therewith and a forwardly extending central portion attached to the center of the bumper bar, said attachment being a slidable one.

6. In a bumper, a plurality of bumper bars in spaced relationship and a supporting bar overlapping portions thereof at its ends to maintain the bumper bars in spaced relationship, said supporting bar and bumper bars being integrally attached to one another, and means for attaching the center of said supporting bar slidably to said bumper bars.

7. In a bumper, spaced bumper bars and a supporting bar attached thereto at its ends rigidly and its center slidably.

8. In a bumper, an integral structure having a front bumping portion and rear supporting portion, said portions having their ends connected to one another and the rear portion brought forward centrally to a point adjacent the rear of the front portions, and means to slidably connect said portions to one another where they come adjacent to each other.

9. In a bumper, vertically spaced bumper bars having inwardly turned, arcuate ends, a supporting bar adapted to overlap said ends on the inner side thereof, and welded to one another, said supporting bar being bent forwardly to a point adjacent a central portion of said bumper bars, in overlapping relationship therebetween on the rear face thereof, a bolt supported by said bumper bars projecting through a slot in said supporting bar, and means on said bolt overlapping said slot and said supporting bar.

10. In a bumper, a supporting bar and bumper bars consisting of a supporting bar end and bumper bars parallel to one another in overlapping engagement, welds on either side of the supporting bar against the face of the bumper bars on one side and welds against the face of the supporting bar on the other side between the adjacent faces of the bumper bars in engagement therewith.

In testimony whereof, I affix my signature.

EDWARD H. McCLOUD.